(12) United States Patent
Garelick et al.

(10) Patent No.: US 6,663,057 B2
(45) Date of Patent: Dec. 16, 2003

(54) ADJUSTABLE PEDESTAL FOR BOAT ACCESSORY

(75) Inventors: Richard J. Garelick, Minneapolis, MN (US); Robert A. Riemenschneider, Oakdale, MN (US); Charles J. Hauck, Inver Grove Heights, MN (US)

(73) Assignee: Garelick Mfg. Co., St. Paul Park, MN (US)

( * ) Notice: Subject to any disclaimer, the term of this patent is extended or adjusted under 35 U.S.C. 154(b) by 0 days.

(21) Appl. No.: 10/098,720

(22) Filed: Mar. 18, 2002

(65) Prior Publication Data

US 2003/0173479 A1 Sep. 18, 2003

(51) Int. Cl.$^7$ .................. F16M 11/00; F16M 13/00; A47F 5/00; A47F 7/00
(52) U.S. Cl. ................ 248/125.8; 248/161; 248/188.2; 248/188.5; 248/418; 297/344.18
(58) Field of Search ................. 248/125.8, 188.2, 248/188.5, 333, 161, 157, 418; 297/344.18

(56) References Cited

U.S. PATENT DOCUMENTS

| | | | |
|---|---|---|---|
| 548,498 A | | 10/1895 | Andren |
| 5,297,849 A | * | 3/1994 | Chancellor ............. 297/344.12 |
| 5,385,323 A | * | 1/1995 | Garelick ..................... 248/161 |
| 5,431,362 A | * | 7/1995 | Carnahan et al. ........... 248/159 |
| D367,841 S | | 3/1996 | Garelick |
| 5,531,413 A | * | 7/1996 | Wolf et al. ............... 248/188.2 |
| 5,595,128 A | * | 1/1997 | De Ladurantaye et al. . 108/140 |
| 5,746,152 A | * | 5/1998 | Huse .......................... 114/363 |
| 5,826,850 A | * | 10/1998 | Goldsmith .................. 248/415 |
| 5,882,076 A | * | 3/1999 | Garelick et al. ........ 297/344.18 |
| 6,012,775 A | * | 1/2000 | Czarnecki .............. 297/344.13 |
| 6,098,937 A | * | 8/2000 | Carnahan et al. ........... 248/158 |
| 6,116,183 A | * | 9/2000 | Crow et al. ................. 114/363 |
| 6,368,225 B1 | * | 4/2002 | Breese et al. ............... 464/183 |
| 6,474,619 B1 | * | 11/2002 | Ma .............................. 248/631 |

* cited by examiner

Primary Examiner—Ramon O. Ramirez
Assistant Examiner—Amy J. Sterling
(74) Attorney, Agent, or Firm—Jacobson and Johnson

(57) ABSTRACT

A vertically adjustable pedestal for a boat accessory such as a table or seat is made up of a pair of telescoped tubular members having opposite facing lengthwise recesses which contain rods to allow one member to adjustably slide with respect to the other yet preventing rotation. A releasable locking device holds the adjusted member at its desired elevation.

12 Claims, 4 Drawing Sheets

ADJUSTABLE PEDESTAL FOR BOAT ACCESSORY

FIELD OF THE INVENTION

This invention is directed toward providing an adjustable pedestal for a boat accessory such as a table or seat by a pair of rigid tubular members which are vertically slidably telescoped with one end of one of the members adaptable for resting on a support surface, such as the deck of a boat, and the other end of the other member adaptable for attachment to the underside of a table or boat seat so that the latter can be placed at a desired elevation and then releasably locked in place.

DESCRIPTION OF THE PRIOR ART

U.S. Pat. No. 5,385,323 in addition to describing earlier adjustable support devices or pedestals in which the support members are telescoped and which provide for the adjustment of the elevation of the attached device, describes a prior art device in which the inner telescoped tubular member has a series of spaced-apart grooves running parallel to its axis on its outer surface and the outer telescoped member having spaced-apart axially extending ribs on its inner surface for engaging respective grooves on the inner tubular member for use in supporting a boat seat. As mentioned in the '323 patent the grooves and ribs are dimensioned so that they loosely fit together, when the two members are not frictionally locked together. This serves the purpose of allowing the members to be slidably adjusted with respect to one another while preventing them from rotating and allows sufficient space between the members so that foreign material will not likely adhere to the members in the inner spaces to interfere with the adjustability. While this has worked well with satisfactory results, there is a drawback. When the seat elevation is being changed, there is a wobbly feel to it so that the user, such as the boat owner, might consider this to be an inferior or not well-made product. In order to eliminate this problem, some table and seat pedestals have been made with telescoped tubular members with precision machined mating grooves and ribs so that they have a snug feel yet are slidably adjustable within one another. This of course adds considerable cost to the device and makes it subject to deterioration due to the elevation of the boat seat or table being repeatedly changed.

SUMMARY OF THE INVENTION

A pedestal for supporting a boat table or boat seat and providing an adjustable elevation for the seat or table is formed with a pair of telescoped tubular members. The inner rigid tubular member has a series of identically dimensioned grooves or slots which are spaced apart from one another on its outer surface and the outer member has a corresponding and identical set of matching lengthwise grooves or slots which are spaced apart along its inner surface. One of the members is adapted for attaching to the underside of a boat seat or boat table and the other member at its opposite end is adaptable for attachment to a supporting surface such as a boat deck. A set of elongated bearing rods dimensioned to fit snugly in the slots or grooves of the members are placed to rest in the opposite facing grooves of both members. The rods may be removable, if necessary. The rods in the grooves prevent the members from rotating with respect to one another yet allow a smooth but firm transition when the boat seat or table is being slidably adjusted to its desired elevation. A split collar is attached to the outer tubular members and a threaded nut and rod assembly is engaged with the collar and has a handle or knob at the end of the rod as a mechanism for releasably frictionally locking the tubular members together when the accessory has been placed at the desired elevation. The rods located in the slots of the telescoped members prevent the members from rotating with respect to one another while permitting them to be lengthwise movable with little or no wobble. Conventionally, if needed, a mechanism may be coupled to the underside of the accessory for adjustably rotating the seat or table to a desired direction.

As a further feature, the rods may be made long enough to rest on their bottom ends or, alternatively, the rods can be made shorter and held in place with a thin plastic sleeve between the two members having a series of through-slots generally corresponding to the dimensions of the shorter rods in the grooves of the telescoped members.

DESCRIPTION OF THE PREFERRED EMBODIMENTS

Figure 1:
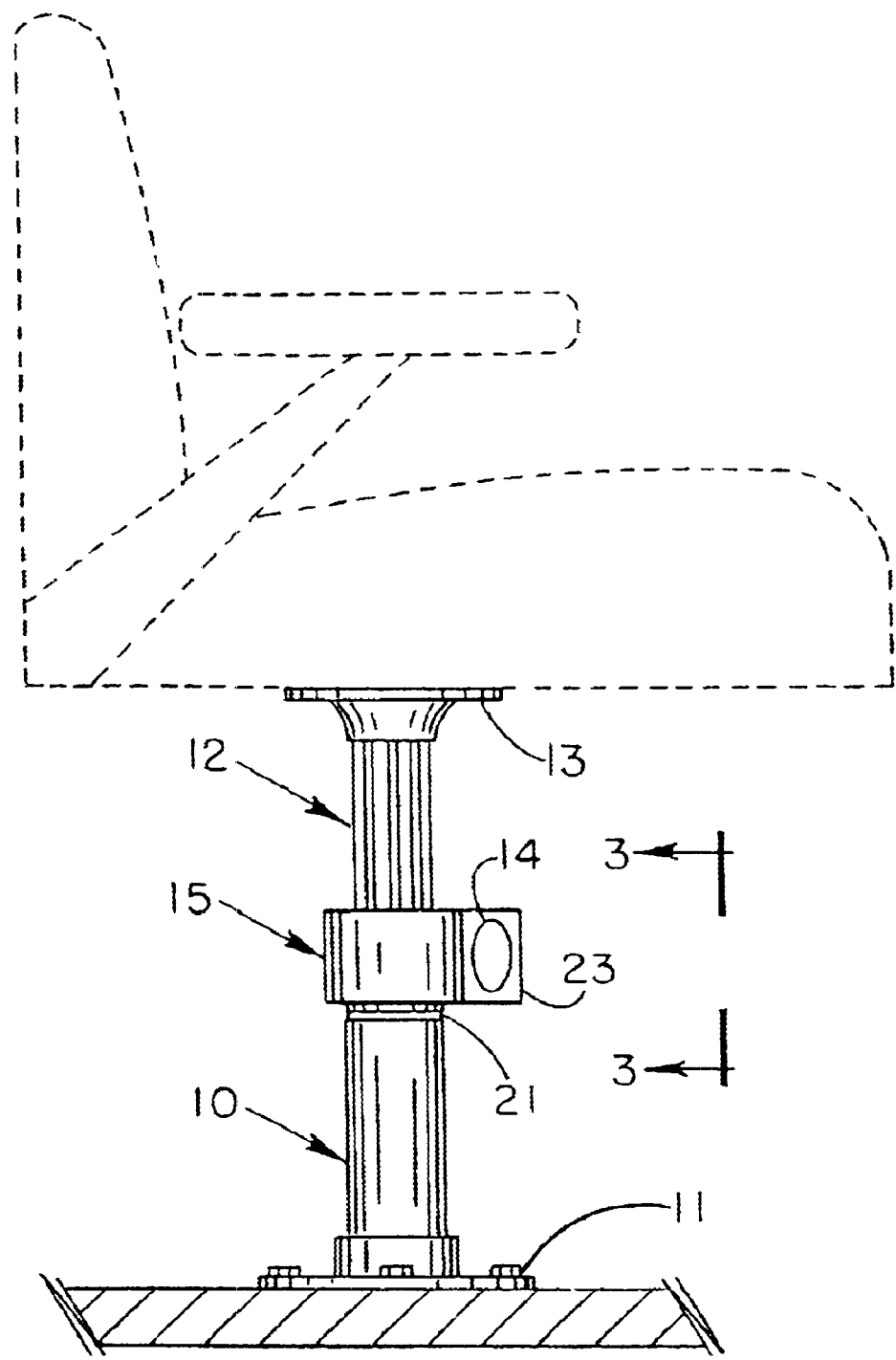
FIG. 1 illustrates the conventional fashion in which a preferred embodiment of the invention is utilized.

As illustrated in FIG. 1, an outer hollow tubular member 10 is engaged at its lower end in a base member 11 which typically is attached in some fashion to a supporting surface such as a boat deck. Slidably telescoped within vertically oriented member 10 is a tubular support member 12. Attached to the upper end of tubular member 12 is a flange or plate 13 or some other convenient device, for attachment to the underside of a boat accessory such as a boat seat or a table. Flange 13 may include some type of mechanism for allowing the attached accessory to be turned to face in a desired direction. A knob or handle 14 may be made conveniently accessible for operating a releasable locking mechanism to hold the telescoped members in position when the boat accessory has been raised or lowered to its desired elevation. A suitable form of a locking mechanism is a split collar 15 which is attached by a bolt (not shown) or in some other convenient fashion to the upper end of outer member 10 for frictionally grasping interior member 12. The manner in which the split collar operates to releasably lock the members in place is described later.

Figure 2:
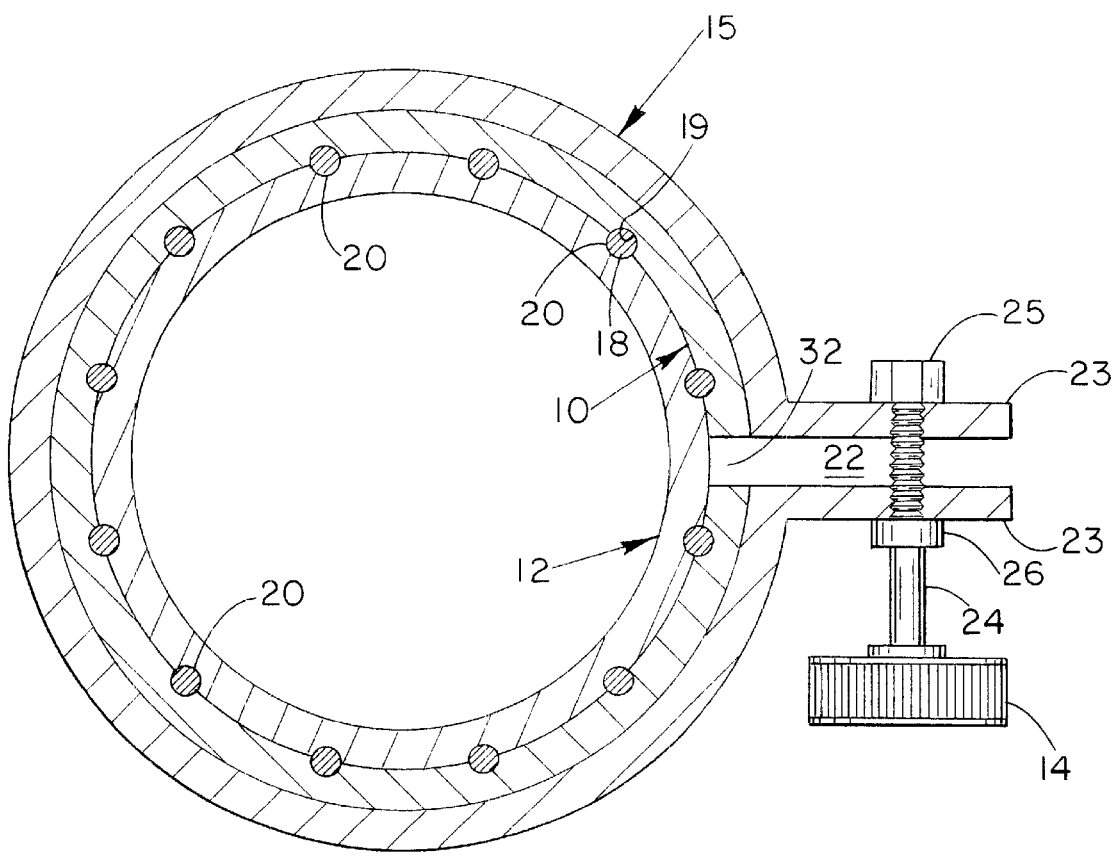
FIG. 2 is a section view showing detail of a preferred form of the invention.
Figure 3:
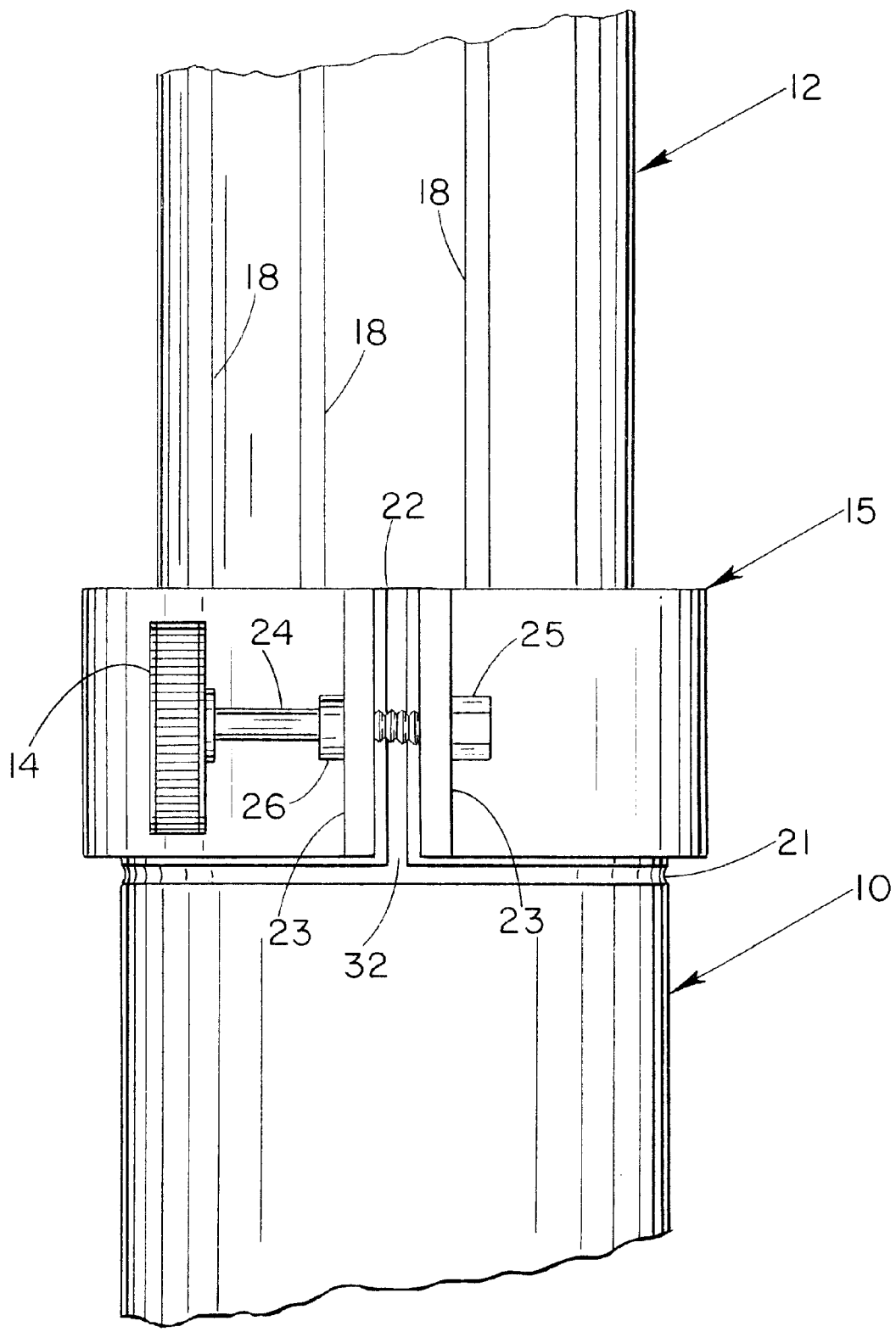
FIG. 3 illustrates detail of the releasable locking mechanism which can be utilized with a preferred form of the invention.

Turning next to FIG. 2, the sectioned view shows the series of peripherally located spaced-apart elongated grooves or slots 18 on the outer surface of the interior telescoped support member 12 and corresponding elongated slots 19 circumferentially spaced around the interior wall of outer member 10 extending parallel to its axis. Located in the aligned spaces 18 and 19 is a set of elongated bearing rods 20 which rest within the generally circular grooves formed by the aligned slots 18 and 19. Rods 20 are dimensioned to snugly or substantially fill the spaces and thereby prevent the two members 10 and 12 from rotating with respect to one another and are made of a material which produces a relatively smooth surface so that the two members can be smoothly slidably moved lengthwise with respect to one another with little or no wobble for adjusting the height of the boat seat or table or other device which is attached to support member 12.

As mentioned earlier, a split collar can be used to releasably lock the members in place. Collar 15 surrounds the upper end of member 10 and is attached rigidly to member 10 such as by a bolt or by welding (not shown). Alternatively, collar 15 can be molded or cast as an integral part of member 10. In the embodiment illustrated collar 15 is attached to the upper end of member 10 and a thin gap or kerf slot 21 is cut out of member 10 which extends approximately half way around the outer periphery of member 10. A vertical slot 32 is also cut out of member 10 so that the upper portion of member 10 which is surrounded by split collar 15 has some degree of flex and memory separate from the lower part of member 10. Collar 15 has a split or gap 22 and a pair of radially extending ears 23 at each side of gap 22. An elongated rod 24 with a handle or knob 14 at one end passes through suitable openings in ears 23. The end of rod 24 opposite knob 14 is threaded to engage nut 25 which is attached to one of the ears 23 and a bushing 26 is rigidly attached to rod 24 and rests against the other ear 23. Knob 14 can be manipulated to rotate rod 24 to thread it into nut 25 thereby causing bushing 26 to force the ears 23 to reduce gap 22 so that collar 15 squeezes down tightly against the top end of member 10 to cause it to frictionally engage inner member 12 thereby preventing member 12 from moving vertically when it has been adjusted to the suitable elevation. Knob 14 can be turned in the opposite direction to unthread rod 24 from nut 25 and thereby release the pressure of member 10 against member 12 and reduce the frictional engagement to permit further vertical adjustment between the two engaged members 10 and 12. Other types of locking mechanisms can be utilized in conjunction with the telescoped members 10 and 12 with their associated grooves and bearing rods to releaseably lock the members when in the desired elevation. For example a retractable pin passing through outer member 10 into vertically spaced apertures in inner member 12 could be used. Other types of frictional releasable locking mechanisms may also be suitable for use.

Bearing rods 20 may be made long enough so that they extend to the bottom end of member 10 and therefore are held in their vertical position by their lower ends resting against the interior of the base support or on the deck. However, shorter rods may be used and they may be kept in place by a thin plastic retaining sleeve 30 which is wrapped around inner member 12 and has a series of vertical slots 31 which are horizontally spaced corresponding to the location of grooves 18 and 19 so that rods 20 rest in slots 31 in sleeve 30 and are thereby held in their vertical location. Preferably sleeve 30 is severed and the two ends 30A and 30B extend out through gap 22 of collar 15 along the interior of ears 23. FIG. 2 illustrates the invention without the retaining sleeve while FIGS. 4 and 5 illustrate an embodiment using sleeve 30.

Figure 4:
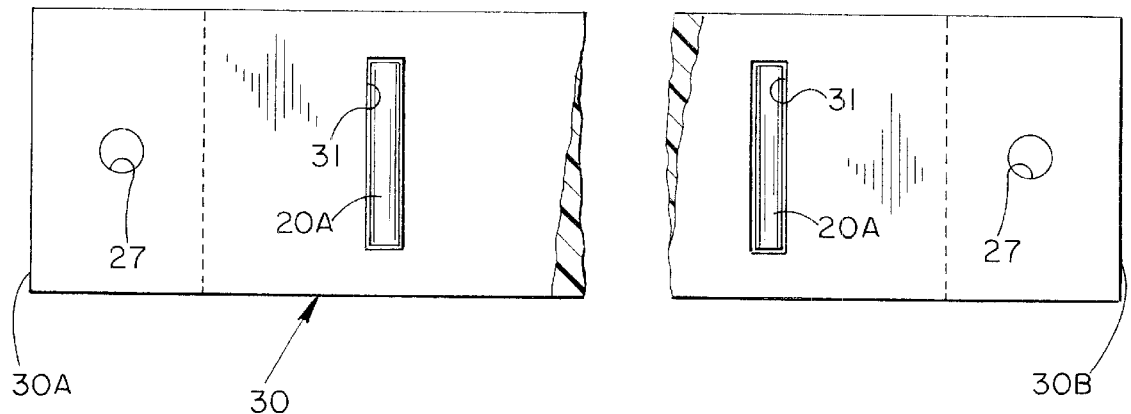
FIG. 4 is a flat projection view of a retaining sleeve used in an embodiment of the invention.
Figure 5:
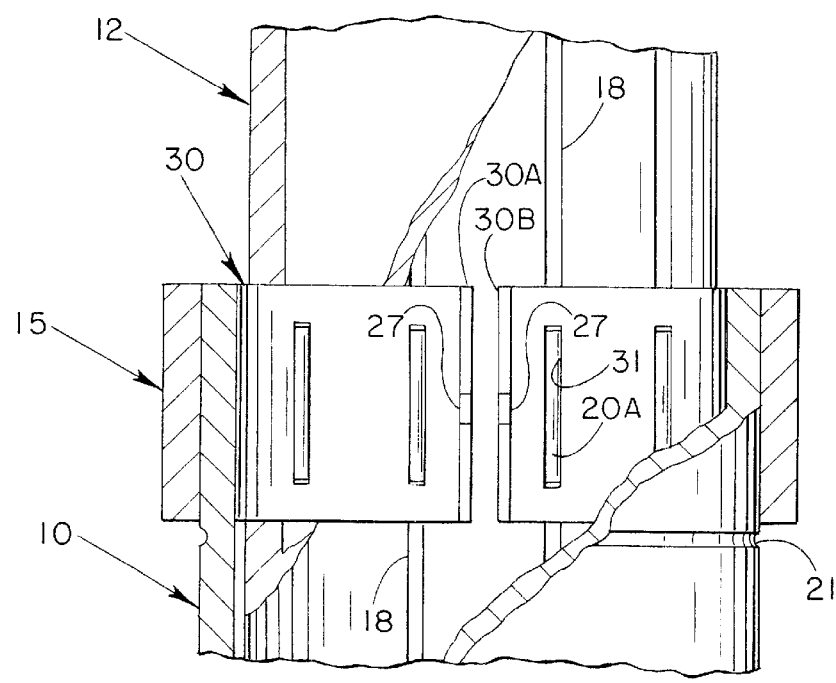
FIG. 5 is a breakaway view showing detail of the invention utilizing a retaining sleeve.

FIG. 4 illustrates a typical plastic retaining sleeve 30 projected in a flat form. Openings 27 in ends 30A and 30B are to permit passage of shaft or rod 24 on locking handle 14. As illustrated by partial breakaway view of FIG. 5, retaining sleeve 30 may be wrapped around vertical support member 12 with slots 31 in place for holding shortened rods 20 in place. The ends 30A and 30B of sleeve 30 are bent radially outward into gap 22 alongside ears 23 of collar 15 so that rod 24 passing through openings 27 holds sleeve 30 in place.

We claim:
1. A vertically adjustable support for a boat accessory such as a seat or table, comprising:
   a first rigid elongated tubular member having a set of spaced-apart parallel elongated grooves on its outer surface;
   a rigid elongated hollow tubular member having a corresponding set of spaced-apart parallel elongated grooves on its inner surface;
   said first tubular member slidably engaged within said hollow tubular member with the sets of grooves in line; and
   a set of elongated rods resting in the aligned sets of grooves preventing said tubular members from rotation with respect to one another while permitting said tubular members to be moved repetitively axially with respect to one another;
   one of said tubular members adapted for coupling to the underside of a boat seat, the other tubular member adapted for attachment at one end to a supporting surface.

2. An adjustable support as described in claim 1 further including a releasable lock attached to one of said tubular members for preventing lengthwise sliding movement between said tubular members.

3. An adjustable support as described in claim 1 further including a retaining sleeve located between said tubular members for holding said rods within their respective grooves.

4. An adjustable support as described in claim 3 wherein said sleeve has a set of elongated slots with said rods resting in said slots.

5. An adjustable support as described in claim 2 wherein said releasable lock comprises a split collar on the outer tubular member for selectively increasing and reducing the frictional engagement of said outer member to the inner tubular member.

6. A vertically adjustable pedestal for a boat accessory comprising:
   a first rigid elongated tubular member having a plurality of elongated spaced-apart grooves parallel to its axis;
   a second rigid elongated tubular member having a corresponding set of elongated spaced-apart grooves parallel to its axis;
   said first and second tubular members slidably telescoped together with the respective grooves aligned with one another with;
   elongated rods resting in the aligned grooves substantially filling the space in said grooves preventing said tubular members from rotating with respect to one another; while permitting said tubular members to be moved repetitively axially with respect to one another;
   one of said tubular members adapted for coupling at one end to the underside of a boat accessory, the other tubular member adapted for attachment at its opposite end to a supporting surface.

7. An adjustable pedestal as described in claim 6 further including a releasable lock attached to one of said tubular members for preventing vertical sliding movement between said tubular members.

8. An adjustable pedestal as described in claim 6 further including a retaining sleeve located between said tubular members for holding said rods within their respective grooves.

9. An adjustable pedestal as described in claim 7 wherein said lock comprises a split collar surrounding the outer tubular member for applying a force to the outer member for releasably frictionally grasping the inner tubular member to prevent it from moving vertically with respect to the outer tubular member.

10. An adjustable pedestal as described in claim 8 wherein said sleeve has a set of elongated slots for receiving and holding said rods in place.

11. A method for making an adjustable pedestal for supporting a boat apparatus, comprising the steps of:

Slidably telescoping a first rigid tubular member having a plurality of spaced-apart axially extending grooves on its outer surface with a second rigid tubular member having a plurality of spaced-apart axially extending grooves on its inner surface with the grooves in one member aligned with the grooves in the other member; and Substantially filling the spaces defined by the aligned grooves with rigid rods such that said members are axially repetitively movable and rotationally locked with respect to one another.

12. A method for making an adjustable pedestal for supporting a boat apparatus as recited in claim 11 further including:

Placing a retaining sleeve between said tubular members for holding said rods in place.

\* \* \* \* \*